US012562680B2

(12) United States Patent
    Ohmura

(10) Patent No.: US 12,562,680 B2
(45) Date of Patent: Feb. 24, 2026

(54) PHOTOVOLTAIC POWER GENERATION DEVICE

(71) Applicant: TOYOTA JIDOSHA KABUSHIKI KAISHA, Aichi-ken (JP)

(72) Inventor: Yukito Ohmura, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 18 days.

(21) Appl. No.: 18/347,563

(22) Filed: Jul. 6, 2023

(65) Prior Publication Data

US 2024/0014777 A1    Jan. 11, 2024

(30) Foreign Application Priority Data

Jul. 8, 2022    (JP) ................................. 2022-110793

(51) Int. Cl.
    *H02S 30/20*        (2014.01)
    *H02S 40/22*        (2014.01)
(52) U.S. Cl.
    CPC .............. *H02S 30/20* (2014.12); *H02S 40/22* (2014.12)
(58) Field of Classification Search
    CPC ...................................................... H02S 10/40
    See application file for complete search history.

(56) References Cited

U.S. PATENT DOCUMENTS

| 2005/0230558 | A1  | 10/2005 | Nakasuka |
| 2014/0125134 | A1* | 5/2014  | Van Straten .......... E04H 12/182 |
|              |     |         | 320/101 |
| 2017/0125615 | A1* | 5/2017  | Lee ....................... H10F 19/804 |
| 2017/0222475 | A1* | 8/2017  | Van Straten ............. H02S 30/20 |
| 2021/0323430 | A1* | 10/2021 | Kulik ...................... B60L 8/003 |
| 2023/0123191 | A1* | 4/2023  | Grimaud .............. B65D 90/022 |
|              |     |         | 220/1.5 |
| 2023/0268871 | A1* | 8/2023  | Flanagan ................ B60L 53/30 |
|              |     |         | 136/245 |

FOREIGN PATENT DOCUMENTS

| JP | 2004142592 A  | 5/2004  |
| JP | 2004-196051 A | 7/2004  |
| JP | 2016521225 A  | 7/2016  |
| JP | 2021075192 A  | 5/2021  |
| WO | 2014168923 A2 | 10/2014 |

* cited by examiner

*Primary Examiner* — Daniel P Malley, Jr.
(74) *Attorney, Agent, or Firm* — HAUPTMAN HAM, LLP

(57)                ABSTRACT
A photovoltaic power generation device includes: a solar panel, one surface of the solar panel being a light receiving surface that is capable of receiving solar light, the other surface of the solar panel being a light reflecting surface that is capable of reflecting solar light; and a support body that supports the solar panel such that the solar panel is capable of being expanded and retracted, in which the solar panel is retracted in an attitude in which the light receiving surface faces the support body.

5 Claims, 7 Drawing Sheets

| | OUTER | | | MIDDLE | | | INNER | | |
|---|---|---|---|---|---|---|---|---|---|
| | MINIMUM | AVERAGE | MAXIMUM | MINIMUM | AVERAGE | MAXIMUM | MINIMUM | AVERAGE | MAXIMUM |
| COMPARATIVE EXAMPLE | 148 | 158 | 165 | 134 | 150 | 157 | 110 | 141 | 153 |
| EXAMPLE | 68 | 83 | 92 | 78 | 94 | 102 | 73 | 103 | 119 |

PHOTOVOLTAIC POWER GENERATION DEVICE

CROSS-REFERENCE TO RELATED APPLICATION

This application claims priority to Japanese Patent Application No. 2022-110793 filed on Jul. 8, 2022, incorporated herein by reference in its entirety.

BACKGROUND

1. Technical Field

The present disclosure relates to a photovoltaic power generation device.

2. Description of Related Art

A photovoltaic power generation device that can increase the electric power generation amount by increasing the ratio of the installation area of a solar panel to a movable body has been conventionally proposed (see Japanese Unexamined Patent Application Publication No. 2021-075192). As the solar panel, a primary panel is attached to the surface of a roof of the movable body, and auxiliary panels are attached to both right and left sides of the primary panel through hinges in an openable and closable manner. At the time of use, the auxiliary panels are expanded to right and left outer sides, so that the electric power generation area increases twofold.

SUMMARY

However, there is a concern that the solar panel cannot perform radiative heat release sufficiently for heat receiving caused by receiving of solar light, depending on a retracting way such as folding. In this case, there is a possibility that the temperature of the retracted solar panel rises and exceeds the heatproof temperature range of a panel base material.

Hence, the present disclosure has an object to obtain a photovoltaic power generation device that can restrain the rise in the temperature of the solar panel when the solar panel is retracted.

For achieving the above object, a photovoltaic power generation device described in claim 1 in the present disclosure includes: a solar panel, one surface of the solar panel being a light receiving surface that is capable of receiving solar light, the other surface of the solar panel being a light reflecting surface that is capable of reflecting solar light; and a support body that supports the solar panel such that the solar panel is capable of being expanded and retracted, in which the solar panel is retracted in an attitude in which the light receiving surface faces the support body.

With the disclosure described in claim 1, the solar panel is retracted in the attitude in which the light receiving surface faces the support body. That is, the solar panel is retracted in an attitude in which the light reflecting surface is oriented to the outside of the support body. Accordingly, the heat of the solar panel when the solar panel is retracted is efficiently released from the light reflecting surface, and the rise in the temperature of the solar panel is restrained.

Further, a photovoltaic power generation device described in claim 2 is the photovoltaic power generation device according to claim 1, in which the support body is a movable body.

With the disclosure described in claim 2, the support body is a movable body. Accordingly, the solar panel is more easily oriented to the Sun compared to the case where the support body is a fixed object. That is, it is possible to efficiently receive solar light, and therefore it is possible to efficiently generate electric power.

Further, a photovoltaic power generation device described in claim 3 is the photovoltaic power generation device according to claim 2, in which the solar panel is pivotally provided on a side surface of the movable body such that an axis direction is an up-down direction, and selectively adopts a retracted attitude in which the light receiving surface faces the side surface or an expanded attitude in which the light receiving surface is oriented in a front-rear direction of the movable body.

With the disclosure described in claim 3, when the solar panel adopts the retracted attitude, the light receiving surface faces the side surface of the movable body. That is, the light reflecting surface of the solar panel is oriented to the outside of the side surface of the movable body. Accordingly, the rise in the temperature of the movable body is restrained. Further, when the solar panel adopts the expanded attitude, the light receiving surface is oriented in the front-rear direction of the movable body. Accordingly, the light receiving area on the light receiving surface of the solar panel is restrained from being reduced by the shadow of the movable body. That is, the decrease in the electric power generation (light receiving) efficiency of the solar panel is restrained.

Further, a photovoltaic power generation device described in claim 4 is the photovoltaic power generation device according to claim 3, in which the solar panel is constituted by a plurality of panels, and is elongated in the expanded attitude by being slid in an upward direction.

With the disclosure described in claim 4, the solar panel is constituted by the plurality of panels, and is elongated in the expanded attitude by being slid in the upward direction. That is, the electric power generation (light receiving) area of the solar panel is enlarged. Accordingly, the electric power generation amount is efficiently increased.

Further, a photovoltaic power generation device described in claim 5 is the photovoltaic power generation device according to claim 4, in which: a functional component is fixed to a top surface of the movable body; and the solar panel is elongated in the upward direction so as to avoid the functional component.

With the disclosure described in claim 5, the solar panel is elongated in the upward direction so as to avoid the functional component fixed to the top surface of the movable body. Accordingly, there is no concern that the function of the functional component is impaired by the solar panel.

As described above, with the present disclosure, it is possible to restrain the rise in the temperature of the solar panel when the solar panel is retracted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7A is a schematic side view showing a state when the expansion of a solar panel according to a reference example is started;

FIG. 7B is a schematic side view showing a state where the solar panel according to the reference example is in the middle of being expanded; and FIG. 7C is a schematic side view showing a state after the expansion of the solar panel according to the reference example is completed.

DETAILED DESCRIPTION OF EMBODIMENTS

Embodiments according to the present disclosure will be described below in detail with reference to the drawings. For explanatory convenience, an arrow UP shown in the figures when appropriate indicates the upward direction of a movable body 10, an arrow FR indicates the forward direction of the movable body 10, an arrow LH indicates the leftward direction of the movable body 10, and an arrow RH indicates the rightward direction of the movable body 10. Accordingly, in the following description, if not otherwise specified, upward, downward, forward, rearward, leftward and rightward directions mean the upward, downward, forward, rearward, leftward and rightward directions of the movable body 10. Further, a right-left direction is synonymous with the vehicle width direction of the movable body 10. Further, an open arrow shown in the figures when appropriate represents solar rays.

Figure 1:
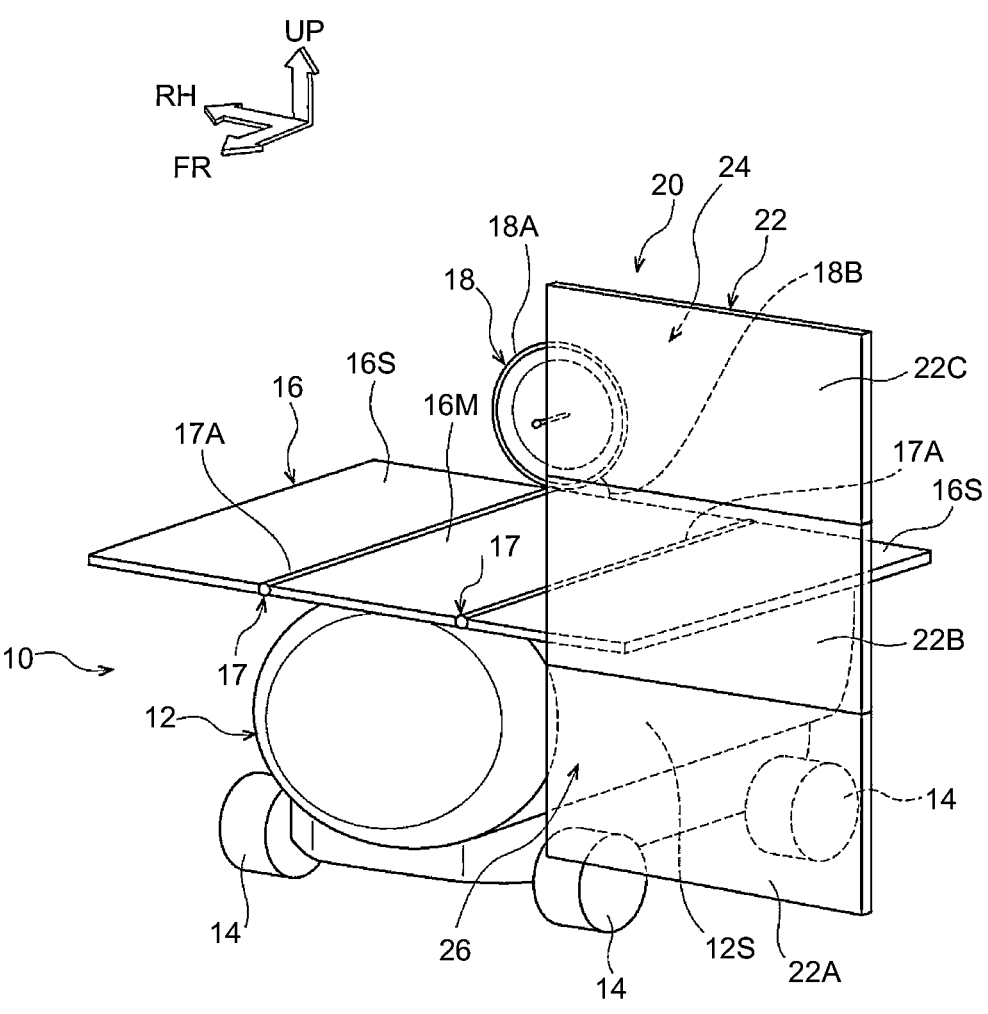
FIG. 1 is a schematic perspective view showing a movable body that constitutes a photovoltaic power generation device according to an embodiment.
Figure 2:
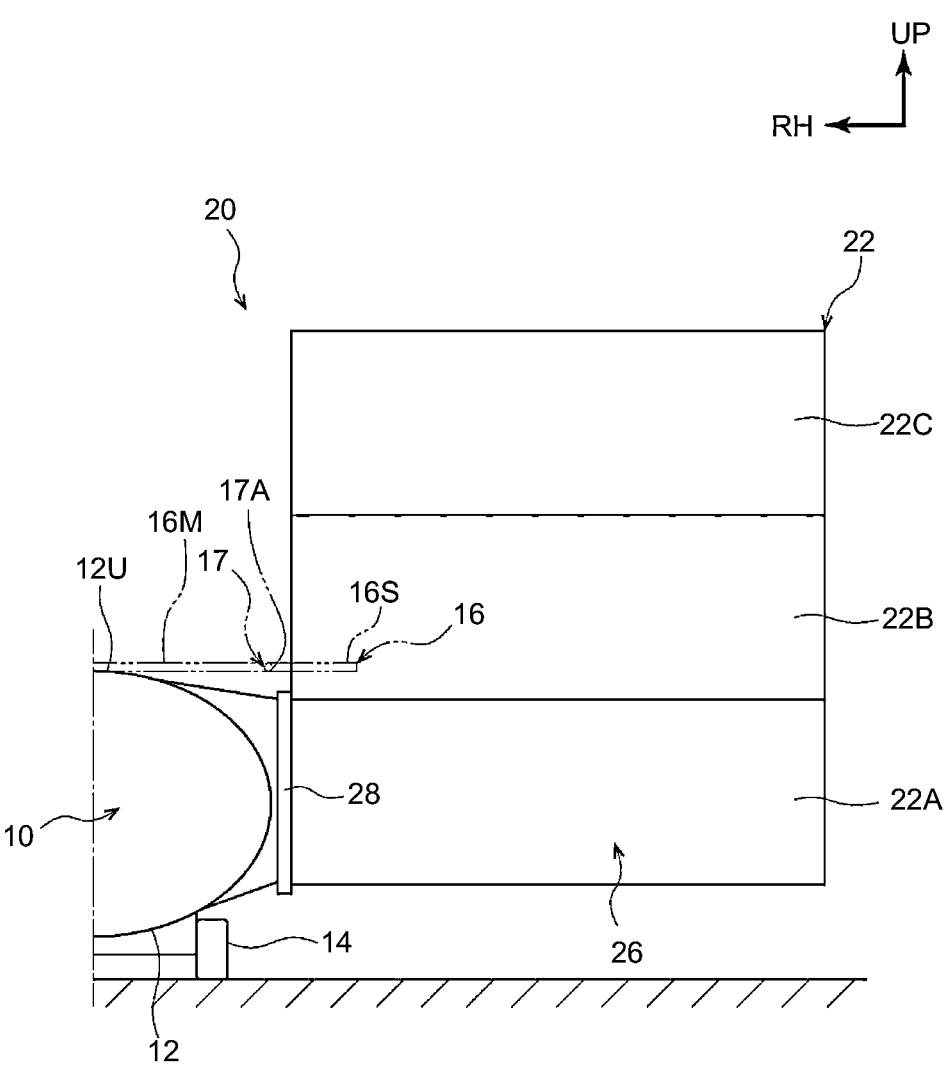
FIG. 2 is a schematic front view showing an expanded attitude of a solar panel according to the embodiment.
Figure 3:
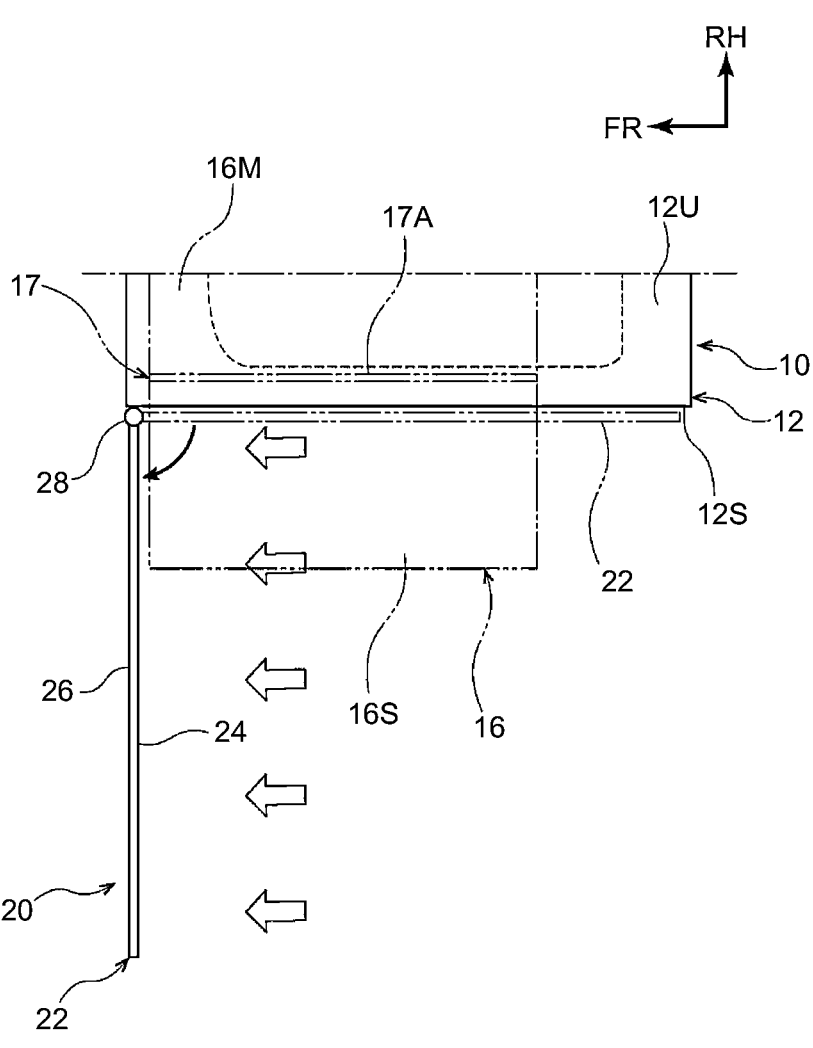
FIG. 3 is a schematic plan view showing the expanded attitude of the solar panel according to the embodiment.
Figure 4:
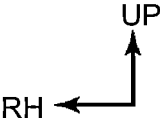
FIG. 4 is a schematic front view showing a retracted attitude of the solar panel according to the embodiment.
Figure 4:
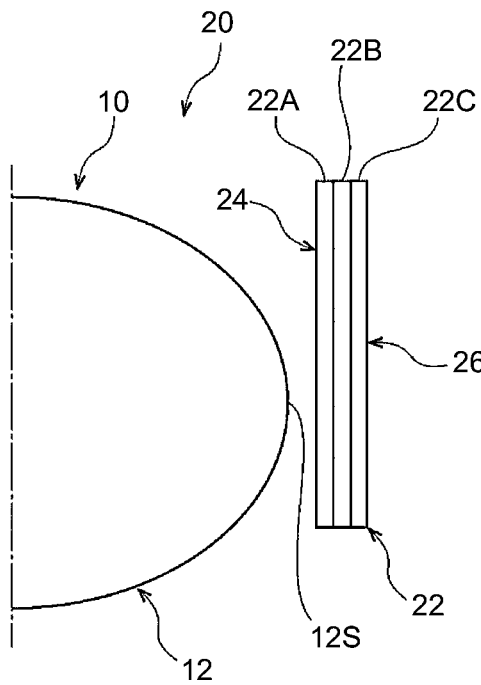
Figure 5:
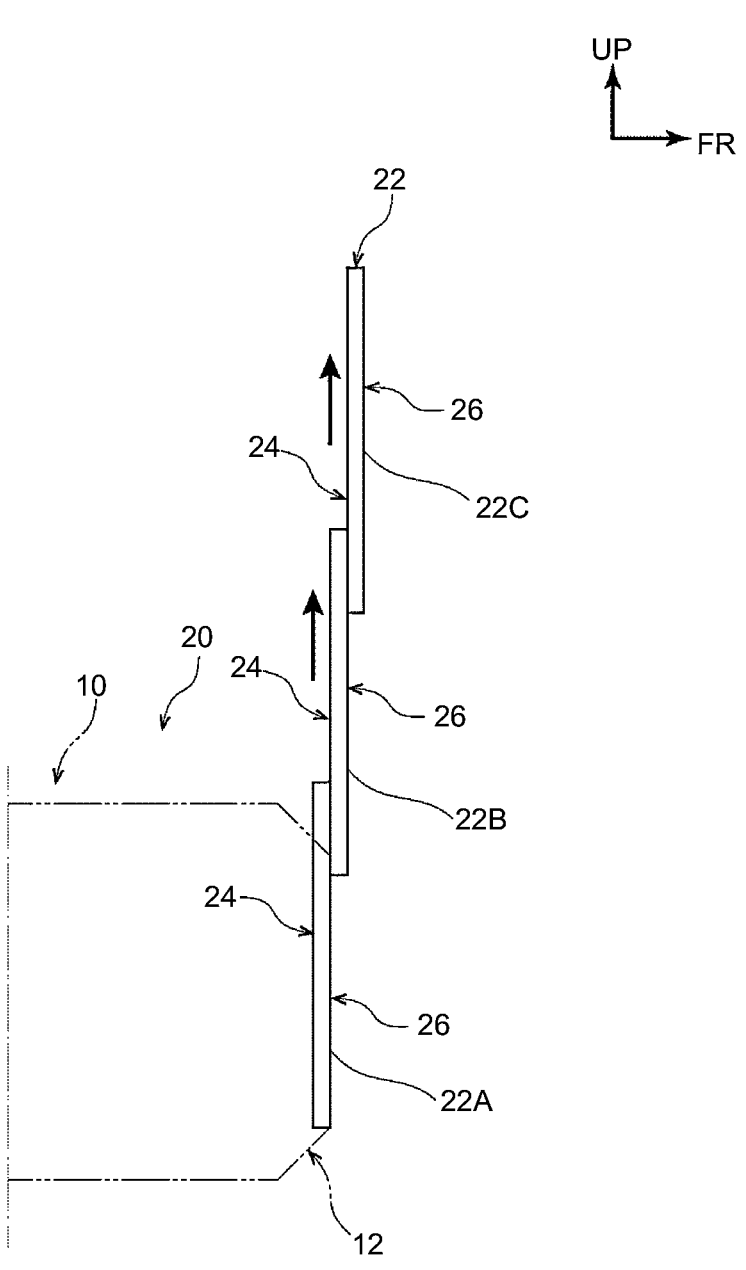
FIG. 5 is a schematic side view showing a state where the solar panel according to the embodiment is in the middle of being expanded.

As shown in FIG. 1 to FIG. 3, the movable body 10, which is an example of a support body substituting a photovoltaic power generation device 20 according to an embodiment, is a vehicle that is used mainly on the land surface of a planet that is other than the Earth and in which the air is thin, as exemplified by on the land surface of the Moon or on the land surface of Mars, and specifically, is a rover that travels on the surface of the Moon for exploration, for example. The movable body 10 includes a pressurized cabin 12 constituting a vehicle cabin in which an occupant rides, a pair of right and left wheels 14 provided at a front-side lower portion of the cabin 12, and a pair of right and left wheels 14 provided at a rear-side lower portion of the cabin 12.

Further, a radiator 16 as an example of the functional component and an antenna 18 (see FIG. 1) as an example of the functional component are provided on a top surface (a roof) 12U of the cabin 12. The radiator 16 includes a main-panel 16M fixed to a front side (a predetermined site located slightly rearward of a front edge portion of the top surface 12U) on the top surface 12U of the cabin 12, and the main-panel 16M is formed in a rectangular shape in planar view.

Further, the radiator 16 includes sub-panels 16S pivotally supported by hinge portions 17, on both right and left sides of the main-panel 16M. That is, at both right and left edge portions of the main-panel 16M, axis portions 17A constituting the hinge portions 17 are provided such that the axis direction is the front-rear direction, and inner-side edge portions of the sub-panels 16S formed in a rectangular shape in planar view are pivotally supported by the axis portions 17A.

The length of the main-panel 16M in the front-rear direction is equivalent to the length of the sub-panel 16S in the front-rear direction. Further, the length of the main-panel 16M in the right-left direction is equivalent to the length (vehicle width) of the cabin 12 in the right-left direction. Moreover, the length of the sub-panel 16S in the right-left direction is about half of the length of the main-panel 16M in the right-left direction. That is, the length of the radiator 16 in the right-left direction in a state where the sub-panels 16S are expanded is about twice as long as the length of the cabin 12 in the right-left direction, so that the heat release effect of the radiator 16 is sufficiently obtained.

As shown in FIG. 1, the antenna 18 is fixed to a rear side on the top surface 12U of the cabin 12, and is positioned rearward of the radiator 16. The antenna 18 includes a main body portion 18A having a circular curved plate shape and a support portion 18B supporting the main body portion 18A, and the support portion 18B is fixed to the top surface 12U of the cabin 12. Moreover, the antenna 18 is disposed so as not to hinder the pivoting of the sub-panel 16S of the radiator 16.

As shown in FIG. 1 to FIG. 5, a solar panel 22 constituting the photovoltaic power generation device 20 is provided on a side surface 12S on one side (for example, the left side) of the cabin 12 (the movable body 10), so as to be capable of being expanded and retracted. The solar panel 22 is constituted by a plurality of panels (for example, three panels), and each panel is formed in a rectangular shape in which the longitudinal direction is the front-rear direction in a retracted attitude described later. Moreover, in an expanded attitude described later, two panels of the three panels can be slid in the upward direction in turn, for elongation.

More specifically, the solar panel 22 includes an inner panel 22A disposed at a lower position without being slid, a middle panel 22B disposed at an intermediate position by being slid in the upward direction relative to the inner panel 22A, an outer panel 22C disposed at an upper position by being slid in the upward direction relative to the middle panel 22B, in order from the inside to the outside in the vehicle width direction, in the retracted attitude.

The middle panel 22B is configured to be capable of being slid to the upward side of the inner panel 22A by a known mechanism (for example, a rack and pinion, a wire, a gear, or the like) that is driven by an occupant's operation in the cabin 12. Moreover, the outer panel 22C is also configured to be capable of being slid to the upward side of the middle panel 22B by a known mechanism that is driven by an occupant's operation in the cabin 12.

Further, one surface of the solar panel 22 is a light receiving surface 24 that is capable of receiving solar light, and the other surface is a light reflecting surface 26 that is capable of reflecting solar light. That is, one surface (front surface) of the solar panel 22 is a light receiving surface 24 that is constituted by a plurality of cell surfaces for electric power generation, and the other surface (back surface) of the solar panel 22 is a light reflecting surface 26 that is coated white or on which a silver-deposited fluorine resin film is put.

Moreover, the solar panel 22 is configured to be capable of selectively adopting the retracted attitude in which the light receiving surface 24 faces the side surface 12S of the cabin 12 or the expanded attitude in which the light receiving surface 24 is oriented to the rearward side (front-rear direction) of the cabin 12 (the movable body 10). More specifically, one edge portion of the inner panel 22A in the longitudinal direction of the inner panel 22A is pivotally supported by an axis portion 28 provided at a front edge portion of the side surface 12S of the cabin 12 such that the axis direction is the up-down direction.

Accordingly, the solar panel 22 pivots around the axis portion 28 by a known mechanism that is driven by an occupant's operation in the cabin 12, and thereby can adopt the retracted attitude in which the solar panel 22 is disposed along the side surface 12S of the cabin 12 and the expanded attitude in which the solar panel 22 is disposed at an angle of 90 degrees with respect to the side surface 12S of the cabin 12 in planar view.

When the middle panel 22B and the outer panel 22C are slid to the upward side at the front edge portion of the side surface 12S of the cabin 12 for adopting the expanded attitude, the solar panel 22 does not interfere with the radiator 16 in the expanded state, which is disposed slightly rearward of the front edge portion of the top surface 12U of the cabin 12. That is, the solar panel 22 supported by the cabin 12 (the movable body 10) so as to be capable of being expanded and retracted can be elongated in the upward direction so as to avoid functional components such as the radiator 16.

Next, the operation of the photovoltaic power generation device 20 according to the embodiment that has the above configuration will be described.

The solar panel 22 retracted on the side surface 12S of the movable body 10 (the cabin 12) pivots around the axis portion 28 to the forward side, and thereby adopts the expanded attitude in which the light receiving surface 24 is oriented to the rearward side of the movable body 10 (the cabin 12). In this state, the middle panel 22B and the outer panel 22C are slid in the upward direction, so that the electric power generation (light receiving) area of the solar panel 22 is enlarged. Accordingly, the electric power generation amount can be efficiently increased.

With the solar panel 22 according to the embodiment, there is no concern that the function of the functional component provided on the movable body 10 (the cabin 12) is impaired, compared to the case where the solar panel 22 is fixed to the side surface 12S of the movable body 10 (the cabin 12) such that the light receiving surface 24 is oriented to the outside and the middle panel 22B and the outer panel 22C, in that state, are slid in the upward direction, for example.

That is, when the middle panel 22B and outer panel 22C of the solar panel 22 are slid (elongated) in the upward direction, the middle panel 22B and the outer panel 22C are slid in the upward direction so as to avoid the radiator 16. Therefore, it is not necessary to reduce the heat release area of the radiator 16. Further, the solar panel 22 is disposed so as to be away from the antenna 18 also, and therefore, there is no concern that the solar panel 22 interrupts electric waves that are received by the antenna 18.

Furthermore, with the solar panel 22 according to the embodiment, it is possible to prevent the generation of such an inconvenience that the temperature in the cabin 12 is raised by the heat receiving due to the receiving of solar light by the solar panel 22 fixed to the side surface 12S of the movable body 10 (the cabin 12). Moreover, in the case where a window portion (not illustrated) is provided on the side surface 12S of the cabin 12, there is no concern that the solar panel 22 obstructs the occupant's vision from the window portion in the cabin 12.

Further, in the case where the support body supporting the solar panel 22 is the movable body 10 that travels on the land surface of a planet in which the air is thin, as exemplified by on the land surface of the Moon or on the land surface of Mars, the light receiving surface 24 of the solar panel 22 is more easily oriented to the Sun at all times, compared to the case where the support body is a fixed object. Consequently, it is possible to efficiently receive solar light, and therefore it is possible to efficiently generate electric power.

Further, when the solar panel 22 pivots to the forward side and adopts the expanded attitude, the solar panel 22 is disposed at an angle of 90 degrees with respect to the side surface 12S of the cabin 12 in planar view. Therefore, an obstacle or the like does not exist in a direction in which the light receiving surface 24 is oriented, so that solar light is efficiently received by the light receiving surface 24. That is, it is possible to enhance the efficiency of electric power generation (light receiving) in the solar panel 22.

In other words, when the solar panel 22 is disposed at an angle of 90 degrees with respect to the side surface 12S of the cabin 12 in planar view, it is possible to restrain or prevent the light receiving area on the light receiving surface 24 from being reduced by the shadow of the cabin 12. Accordingly, it is possible to restrain or prevent the decrease in the efficiency of electric power generation (light receiving) in the solar panel 22.

Meanwhile, when the solar panel 22 in the expanded attitude in which the outer panel 22C and the middle panel 22B are lowered and are overlapped with the inner panel 22A pivots around the axis portion 28 to the rearward side and adopts the retracted attitude, the light receiving surface 24 of the solar panel 22 faces the side surface 12S of the cabin 12. That is, the solar panel 22 is retracted in an attitude in which the light reflecting surface 26 is oriented to the outside of the side surface 12S of the cabin 12.

Accordingly, when the solar panel 22 is retracted, it is possible to efficiently release the heat of the solar panel 22 from the light reflecting surface 26, to restrain the rise in the temperature of the solar panel 22, and to restrain the rise in the temperature in the cabin 12. Thereby, it is possible to reduce the possibility of exceeding the heatproof temperature range of a panel base material of the lightweight and low-cost solar panel 22.

Figures 6A, 6B:
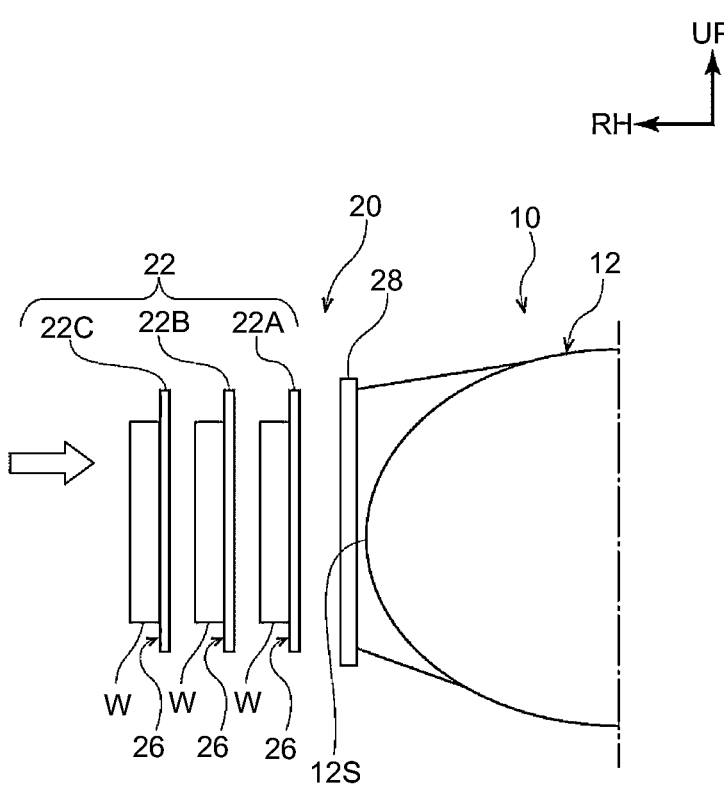
FIG. 6A is a schematic back view showing the retracted attitude of the solar panel according to the embodiment.
FIG. 6B is a table showing a temperature result for each panel that constitutes the solar panel according to the embodiment.

FIG. 6A and FIG. 6B show simulation results about temperature change of the solar panel 22 (the inner panel 22A, the middle panel 22B and the outer panel 22C) at a moon surface temperature of 100° C. The heatproof temperature of each panel base material constituting the inner panel 22A, middle panel 22B and outer panel 22C of the solar panel 22 is up to 120° C.

As shown in FIG. 6A, a white coating W (schematically illustrated in a rectangular shape) is applied on each back surface of the inner panel 22A, middle panel 22B and outer panel 22C of the solar panel 22. That is, FIG. 6A shows a state where the inner panel 22A, middle panel 22B and outer panel 22C of the solar panel 22 are retracted such that the respective light reflecting surfaces 26 are oriented to the outside of the side surface 12S of the cabin 12.

FIG. 6B shows a comparative example in which each light receiving surface 24 of the inner panel 22A, the middle panel 22B and the outer panel 22C is oriented to the outside (each light reflecting surface 26 is oriented to the inside) when the solar panel 22 adopts the retracted attitude, and an example in which each light receiving surface 24 of the inner panel 22A, the middle panel 22B and the outer panel 22C is oriented to the inside (each light reflecting surface 26 is oriented to the outside) when the solar panel 22 adopts the retracted attitude.

As shown in FIG. 6B, as for the inner panel 22A, middle panel 22B and outer panel 22C of the solar panel 22 in the example, the rise in temperature is restrained compared to the inner panel 22A, middle panel 22B and outer panel 22C of the solar panel 22 in the comparative example. Moreover, the maximum temperature of the solar panel 22 in the example is 119° C. for the inner panel 22A, and is lower than 120° C., which is the heatproof temperature of the panel base material. In this way, with the photovoltaic power generation device 20 according to the embodiment, it is possible to reduce the possibility of exceeding the heatproof temperature range of the panel base material of the solar panel 22.

Reference Example

The middle panel 22B and outer panel 22C of the solar panel 22 is not limited to a slide type in which the middle panel 22B and the outer panel 22C are slid in the upward direction. For example, as shown in FIG. 7A, a pivot type in which an upper edge portion of the middle panel 22B and a lower edge portion (a lower edge portion when the outer panel 22C is elongated in the upward direction as shown in FIG. 7C) of the outer panel 22C are pivotally coupled by an axis portion 22D in which the axis direction is the longitudinal direction of the middle panel 22B and the outer panel 22C may be adopted.

Figures 7A, 7B, 7C:
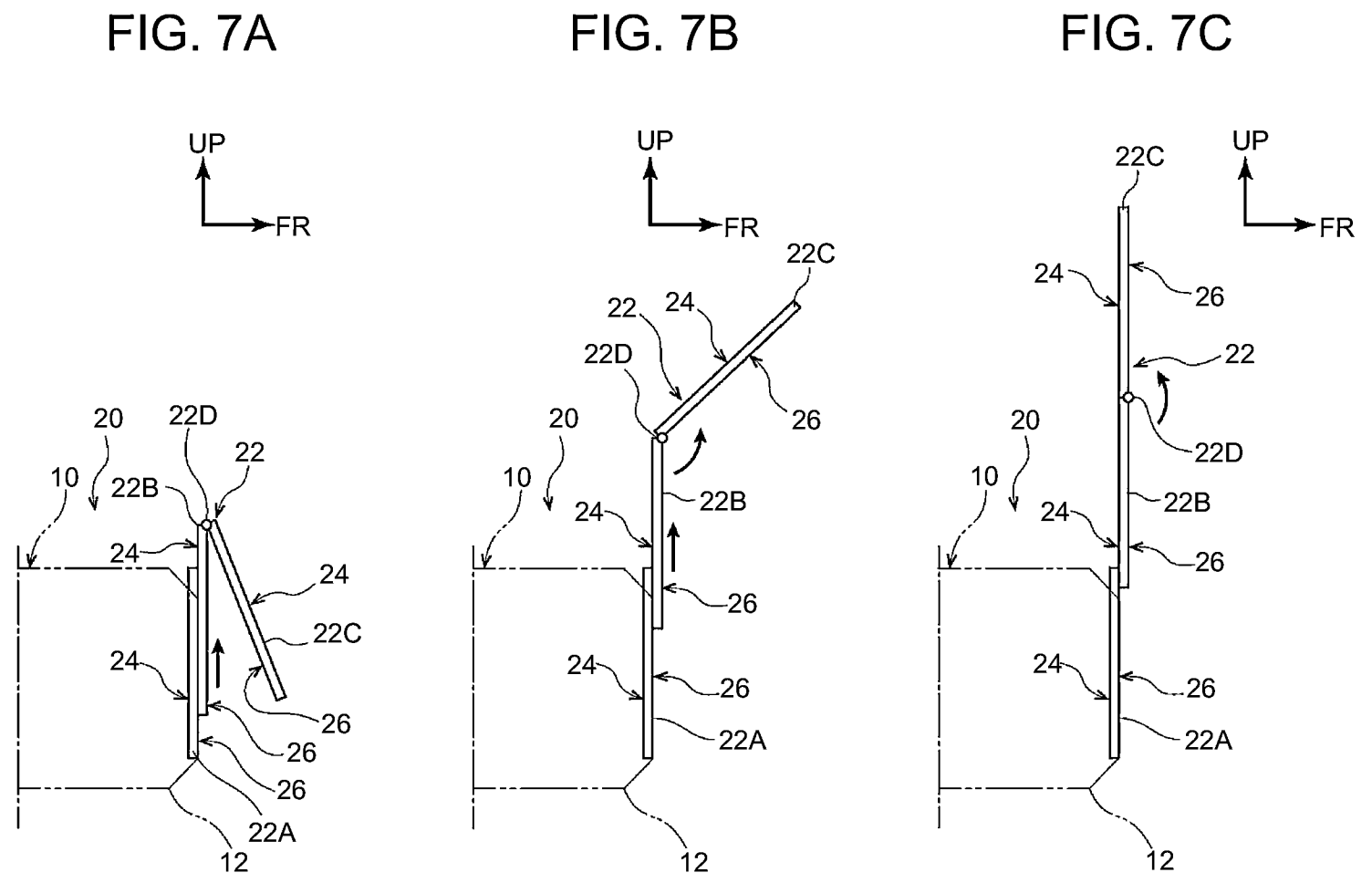

In the case of this pivot-type solar panel 22, the outer panel 22C pivots around the axis portion 22D with the slide of the middle panel 22B in the upward direction, as shown in FIG. 7B, and thereby the solar panel 22 can be elongated as shown in FIG. 7C. In the case of this pivot type, in the solar panel 22 in the retracted attitude, only the light receiving surface 24 of the outer panel 22C is oriented to the outside. Therefore, as the solar panel 22, the above slide type is preferable.

The photovoltaic power generation device 20 according to the embodiment has been described above based on the drawings. The photovoltaic power generation device 20 according to the embodiment is, however, not limited to the illustrated photovoltaic power generation devices, and the design can be appropriately altered without departing from the spirit of the present disclosure. For example, in the case where the solar panel 22 is constituted by a panel base material having flexibility, a winding type in which the solar panel 22 is elongated in the upward direction by the cancellation of winding may be adopted.

Further, the support body is not limited to the movable body 10, and may be a support body that is fixed at a predetermined position. Further, the movable body 10 is not limited to vehicles that are used on the surface of the Moon, and the like, and for example, may be a vehicle such as a trailer that has a living space. That is, the photovoltaic power generation device 20 according to the embodiment can be applied also to vehicles that are used on the Earth.

Further, the functional component that is provided on the top surface 12U of the cabin 12 is not limited to the radiator 16 and the antenna 18. The functional component in the embodiment includes all functional components that are disposed so as to be offset in the front-rear direction relative to the solar panel 22 in the expanded attitude, such that the upward elongation of the middle panel 22B and outer panel 22C of the solar panel 22 is not hindered.

What is claimed is:

1. A photovoltaic power generation device comprising:
   a solar panel, one surface of the solar panel being a light receiving surface that is capable of receiving solar light, the other surface of the solar panel being a light reflecting surface that is capable of reflecting solar light;
   a support body that supports the solar panel such that the solar panel is capable of being expanded and retracted; and
   a radiator, wherein
   the solar panel is retracted in an attitude in which the light receiving surface is closer to the support body than the light reflecting surface,
   the support body is a moveable body, wherein a side surface of the moveable body extends in a longitudinal direction of the moveable body, and
   the solar panel is pivotally provided on the side surface of the moveable body via an axis such that an axis direction is in an up-down direction, perpendicular to the longitudinal direction, and selectively adopts:
      a retracted attitude in which the light receiving surface is parallel to the up-down direction and the longitudinal direction, or
      an expanded attitude in which the light receiving surface is parallel to the up-down direction and perpendicular to the longitudinal direction,
   wherein the axis extends in the up-down direction
   the solar panel is pivotably supported by the axis,
   the radiator is provided on an upper surface of the moveable body, the radiator is a rectangular panel and arranged to be substantially parallel on a horizontal direction,
   the axis of the solar panel is provided outward of an end of the radiator in the longitudinal direction of the moveable body,
   the radiator is configured such that a total length of the radiator in a left-right direction is greater than a total length of the moveable body in the left-right direction, and
   the left-right direction is perpendicular to the up-down direction and the longitudinal direction.

2. The photovoltaic power generation device according to claim 1,
   wherein the solar panel is constituted by a plurality of panels, and is elongated in the expanded attitude by being slid in an upward direction, and
   an upper end of the solar panel in the expanded attitude is positioned higher, in the up-down direction, than an upper end of the radiator.

3. The photovoltaic power generation device according to claim 2, wherein:
   a functional component is fixed to a top surface of the movable body; and
   the solar panel is elongated in the upward direction so as to avoid the functional component.

4. The photovoltaic power generation device according to claim 1, wherein in the expanded attitude the light receiving surface is oriented at an angle of 90-degrees with respect to the side surface of the moveable body.

5. The photovoltaic power generation device according to claim 1, wherein in the expanded attitude the solar panel is rotated 90-degrees about the axis relative to the retracted attitude.

* * * * *